G. H. MUELLER.
CAR DUMPING APPARATUS.
APPLICATION FILED JAN. 2, 1913. RENEWED NOV. 29, 1915.
1,240,867.  Patented Sept. 25, 1917.
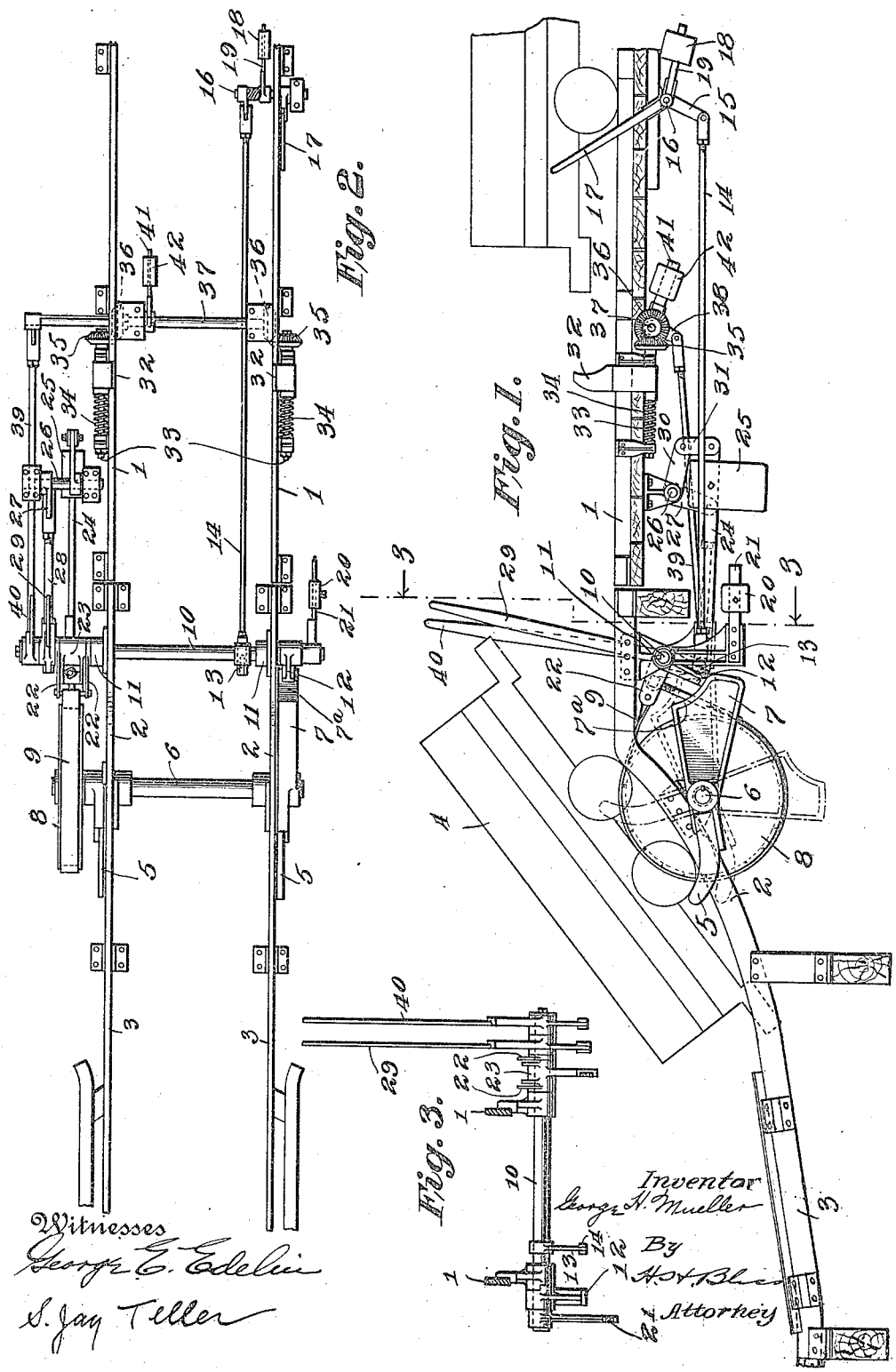
Witnesses
George E. Edelin
S. Jay Teller
Inventor
George H. Mueller
By H. A. Bl—
Attorney

UNITED STATES PATENT OFFICE.

GEORGE H. MUELLER, OF COLUMBUS, OHIO, ASSIGNOR TO THE JEFFREY MANUFACTURING COMPANY, OF COLUMBUS, OHIO, A CORPORATION OF OHIO.

CAR-DUMPING APPARATUS.

1,240,867. Specification of Letters Patent. Patented Sept. 25, 1917.

Application filed January 2, 1913, Serial No. 739,839. Renewed November 29, 1915. Serial No. 64,200.

*To all whom it may concern:*

Be it known that I, GEORGE H. MUELLER, a citizen of the United States, residing at Columbus, in the county of Franklin and State of Ohio, have invented certain new and useful Improvements in Car-Dumping Apparatus, of which the following is a specification, reference being had therein to the accompanying drawing.

This invention relates to devices for use in connection with car dumps of the type shown and claimed in my co-pending applications for car dumping apparatus, Serial No. 639,306, filed July 19, 1911, and Serial No. 739,838, filed January 2, 1913.

The principal object of the invention is to provide improved means whereby a car in inclined dumping position may be released by another car approaching the place of dumping. Another object is to provide improved means within the control of the operator for temporarily stopping cars as they approach the dump. Other objects will be apparent from the following specification and the accompanying drawings.

Of the drawings, which illustrate one embodiment of my invention,

Figure 1 is a side elevation,

Fig. 2 is a plan view, and

Fig. 3 is a fragmentary cross sectional view taken along the line 3—3 of Fig. 1.

Referring to the drawings, it will be noted that the main track along which the cars move comprises three sections, 1, 2 and 3. The sections 1 and 3 are nearly horizontal but are preferably slightly inclined as shown in the drawings. The section 1, which will be termed the car feed track, is at an elevation considerably above that of the section 3, which will be termed the car discharge track. The two sections 1 and 3 are connected by means of the stationary sharply inclined track section 2. It will be apparent that a car, such as that indicated at 4, will move first along the track section 1 in an approximately horizontal position and, when reaching the section 2, will be sharply inclined into such a position that its contents can slide out through the forward end if the door is opened. From the sharply inclined section 2 the car will pass onward in the initial direction onto the horizontal or slightly inclined section 3.

In order that the car may be retained in its inclined dumping position long enough to permit the contents to be discharged, means are provided for engaging the car and holding it in position on the inclined section 2. The means shown in the drawings comprises the two horns 5, 5, which are secured to the transverse rotatable shaft 6. This shaft carries at one end the arm or counterweight 7 and at the other end is provided with a brake wheel 8. A brake band 9 engages the wheel 8 and when tightened resists or prevents rotation of the brake wheel and consequently of the shaft 6 and horns 5, 5.

10 is a transverse rock shaft mounted near the shaft 6 in bearings 11, 11, secured to the track rails. At the end of the shaft 10 which is adjacent the arm 7, there is secured a stop or dog 12 which is adapted to engage a suitably curved surface $7^a$ of the arm. It will be clear that when the dog is in the position indicated in Fig. 1, the arm will be engaged and movement of the horns 5, 5 will be limited to prevent their passing entirely out of the path of the wheels of a car. However, when the stop 12 is moved backward the arm is disengaged and the horns are permitted to move forward and downward out of the path of the car wheels.

For turning the shaft 10 to move the dog 12 out of and into operative position, the following mechanism is provided: 13 is a lever arm secured to the shaft 10 and to it is pivotally connected the forward end of a link 14. The rear end of the link is connected to a lever 15 secured to a rock shaft 16. 17 is a trip lever also secured to the rock shaft 16 and extending upward into the path of the wheels of the cars on the track 1. A counterweight 18 on an arm 19 secured to the rock shaft 16 serves to normally hold the mechanism in position with the dog 12 ready to engage the arm 7. The counterweight 18 is supplemented by the counterweight 20 mounted on the arm 21 secured to the shaft 10. When the lever 17 is engaged by a car wheel the mechanism is moved against the action of the counterweights and the dog 12 is drawn backward out of engaging position.

One end of the brake band 9 is secured to links 22, 22, which are preferably loosely mounted on the shaft 10. The other end of the brake band 9 is connected to a lever 23 which is rotatably mounted on the shaft 10. Secured to this lever 23 is a horizontal arm 24, upon which is adjustably mounted a counter-weight 25. This counterweight serves to move the lever 23 in the direction to tension the brake band.

For lifting the counterweight to release the brake band, there is provided a small rock shaft 26 which is connected by means of the arm 27 and the rod 28 with a hand lever 29 loosely mounted on the rock shaft 10. An arm 30 and a link 31 connect the rock shaft 26 with the end of the weight arm 24. By means of this construction the operator by moving the hand lever 29 can lift the weight and release the brake.

For stopping cars on the feed track 1 at the will of the operator there are provided horns 32, 32. These horns are mounted upon rock shafts 33, 33 which are mounted in suitable bearings secured to the track. Preferably the horns can have a limited sliding movement along the rock shafts and are held in their normal forward positions by means of coil springs 34, 34. When the horns are engaged by a car it will be clear that the springs permit them to yield slightly thus reducing the shock incident to the stopping of the car.

At the rear end of each of the shafts 33 there is provided a bevel gear wheel 35 which meshes with a similar gear wheel 36 on a transverse rock shaft 37. At one end of the rock shaft 37, preferably that at the side of the dump on which the lever 29 is located, there is secured a lever arm 38. The arm 38 is connected by means of a link 39 with a hand lever 40 loosely mounted on the shaft 10. 41 is an arm secured to the rock shaft 37 and mounted upon this arm is a counterweight 42. It will be seen that this counterweight tends to move the rock shaft 37 in the direction to move the horns, 32, 32 outward away from operative car wheel engaging positions. The operator, however, by means of the lever 40 can, at will, move the horns inward into positions to engage the car wheels.

The operation of the apparatus will now be readily apparent. Let it be assumed that the horns 5, 5 are in the positions indicated by the upper dotted lines of Fig. 1. As a car approaches dumping position its wheels engage the horns, and the brake resists the forward and downward movement of the horns and the car, the car being thus gradually brought into the position indicated by the full lines in Fig. 1. The stop 12 being normally held in operative position by the counterweights 18 and 20 engages the arm 7 and prevents the horns from moving entirely out of the path of the car. The end of the car may be opened to permit the contents to slide out either manually or by means of suitable automatic devices. The car is held in its inclined dumping position until released by the backward movement of the stop 12. This is effected by a second car moving along the feed track 1. This second car engages the trip lever 17 and forces it downward thus rotating the shafts 16 and 10 and moving the dog backward. As soon as the dog has been moved to its inoperative position, the first car can move onward, the operator, if necessary, slightly loosening the brake by means of the lever 29. After the first car has moved entirely past the horns the operator, by still further loosening the brake, permits the horns to be thrown upward into their initial positions by the counterweighted arm 7. The horns are then ready to engage the second car.

From the foregoing description it will be seen that the dump is entirely automatic so far as the positively engaging stop or dog 12 is concerned. It is only necessary for the operator, by means of the lever 29 to regulate the action of the brake. The brake is normally applied by the counterweight 25, but the operator, by pushing the lever in one direction or the other, can decrease or add to the action of the weight. For a heavily loaded car it may be necessary for him to increase the brake action, and in order to permit the horns to move upward, it will be necessary for him to materially decrease the brake action.

The horns 32, 32 may be used to stop a car on the feed track 1 in case it follows too soon after the preceding car on the dump. In this way the operator is enabled to hold the first car in dumping position as long as is necessary. By tightening the brake he can prevent the car moving onward even though the dog 12 is moved, and by throwing the horns 32, 32 into operative positions, he can prevent the second car moving onward to interfere with the first. It will be noted that when the horns 32, 32 are used, they stop the car in such a position that the trip lever 17 is held down. This makes it possible under these conditions for the operator to control the car on the dump entirely by means of the brake. As soon as the first car is entirely empty he can release the brake and permit it to move on. After the first car is out of the way, he then, by simply releasing the horns 32, 32 can permit the second car to move into dumping position, the stop 12 being promptly returned to its operative position by the counterweight 18 and 20.

What I claim is:—

1. In a car dumping apparatus, the combination with approximately horizontal car feed and car discharge tracks at different levels, and a sharply inclined rigidly mounted stationary track connecting the feed and discharge tracks, of means for temporarily stopping a car in inclined dumping position on the sharply inclined track, means in position to be engaged by a car on the feed track for releasing the said car stopping means, and manually controlled means for stopping a car on the feed track after engaging with the said releasing means.

2. In a car dumping apparatus, the combination with approximately horizontal car feed and car discharge tracks at different levels, and a sharply inclined rigidly mounted stationary track connecting the feed and discharge tracks, of a transverse rock shaft, horns secured to the rock shaft and adapted to be swung into and out of the path of the wheels of a car on the sharply inclined track, a movable stop for positively limiting the movement of the shaft and the horns in one direction, means in position to be engaged by a car on the feed track for moving the said stop to an inoperative position, and manually controlled car stops between the said stop moving means and the inclined track.

3. In a car dumping apparatus, the combination with approximately horizontal car feed and car discharge tracks at different levels, and a sharply inclined rigidly mounted stationary track connecting the feed and discharge tracks, of a transverse rock shaft, horns secured to the rock shaft and adapted to be swung into and out of the path of the wheels of a car on the sharply inclined track, a movable stop for positively limiting the movement of the shaft and the horns in one direction, means for normally holding the stop in operative position, means in position to be engaged by a car on the feed track for moving the said stop to an inoperative position and movable car stops between the last said stop-moving means and the horns.

4. In a car dumping apparatus, the combination with approximately horizontal car feed and car discharge tracks at different levels, and a sharply inclined rigidly mounted stationary track connecting the feed and discharge tracks, of a transverse rock shaft, horns secured to the rock shaft and adapted to be swung into and out of the path of the wheels of a car on the sharply inclined track, a manually controllable brake for resisting the movement of the shaft and the horns, a movable stop for positively limiting the movement of the shaft and the horns in one direction, means in position to be engaged by a car on the feed track for moving the said stop to an inoperative position, and manually movable car stops adapted to arrest a car on the feed track after it has engaged the last said means.

5. In a car dumping apparatus, the combination with approximately horizontal car feed and car discharge tracks at different levels, and a sharply inclined rigidly mounted stationary track connecting the feed and discharge tracks, of means for temporarily stopping a car in inclined dumping position on the sharply inclined track, means in position to be engaged by a car on the feed track for releasing the said car stopping means, and manually controllable means for stopping a car on the feed track after it has engaged with the said releasing means.

6. In a car dumping apparatus, the combination with approximately horizontal car feed and car discharge tracks at different levels, and a sharply inclined rigidly mounted stationary track connecting the feed and discharge tracks, of a transverse rock shaft, horns secured to the rock shaft and adapted to be swung into and out of the path of the wheels of a car on the sharply inclined track, a movable stop for positively limiting the movement of the shaft and the horns in one direction, means in position to be engaged by a car on the feed track for moving the said stop to an inoperative position, and manually controllable means for stopping a car on the feed track and positioned to stop it while in engagement with the aforesaid stop moving means.

7. In a car dumping apparatus, the combination with approximately horizontal car feed and car discharge tracks at different levels, and a sharply inclined rigidly mounted stationary track connecting the feed and discharge tracks, of a transverse rock shaft, horns secured to the rock shaft and adapted to be swung into and out of the path of the wheels of a car on the sharply inclined track, a manually controllable brake for resisting the movement of the shaft and the horns, a movable stop for positively limiting the movement of the shaft and the horns in one direction, means in position to be engaged by a car on the feed track for moving the said stop to an inoperative position, and means within the control of an operator for stopping a car on the feed track, the said car stopping means serving to maintain the car in a position to hold the stop in inoperative position.

In testimony whereof I affix my signature, in presence of two witnesses.

GEORGE H. MUELLER.

Witnesses:
RALPH MOSES,
DUDLEY T. FISHER.

Copies of this patent may be obtained for five cents each, by addressing the "Commissioner of Patents, Washington, D. C."